BINARY COUNTER TRANSISTOR CIRCUIT

Filed Oct. 18, 1955 2 Sheets-Sheet 1

INVENTOR
B. OSTENDORF, JR.
BY John E. Cassidy
ATTORNEY

Sept. 8, 1959 B. OSTENDORF, JR 2,903,676

BINARY COUNTER TRANSISTOR CIRCUIT

Filed Oct. 18, 1955 2 Sheets-Sheet 2

INVENTOR
B. OSTENDORF, JR.
BY
John E. Cassidy
ATTORNEY

United States Patent Office 2,903,676

Patented Sept. 8, 1959

2,903,676

BINARY COUNTER TRANSISTOR CIRCUIT

Bernard Ostendorf, Jr., Stamford, Conn., assignor to Bell Telephone Laboratories, Incorporated, New York, N.Y., a corporation of New York Application October 18, 1955, Serial No. 541,206

9 Claims. (Cl. 340—166)

Figure 1:
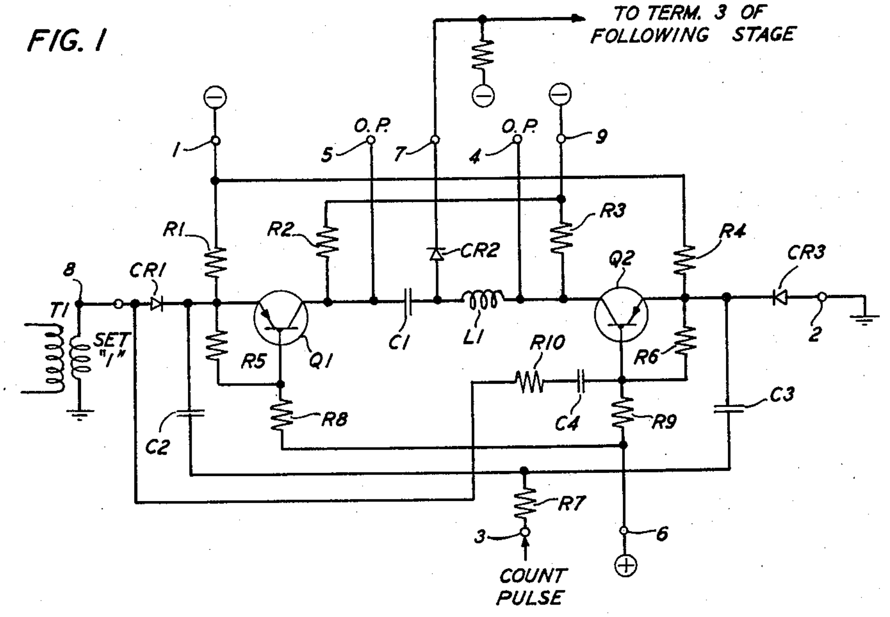

This invention is an improved binary counter circuit. Binary counter circuits are widely used especially as counters, per se, and as frequency dividers. When used as counters they are generally arranged in tandem. That is to say a plurality of stages are connected in sequence. As is well known, in binary counters the first of a series of pulses applied to the first stage produces a first condition in the first stage. The second pulse produces a second condition in the first stage and a first condition in the second stage. A third pulse produces a first condition of the first stage while the first condition of the second stage is maintained. A fourth pulse produces a second condition of the first stage, a second condition of the second stage and a first condition of a third stage. The first stage goes through a complete cycle in two pulses. The second stage goes through a complete cycle in four pulses. The third stage goes through a complete cycle in eight pulses. And, in general, an array of stages connected in tandem will make it possible to count a total of $2^n$ pulses during each counting train, where $n$ represents the number of stages in the array.

When employed as a frequency divider, a potential wave of the frequency to be divided may be applied to the input of a single stage, or to the input of the first stage of a number of stages connected in tandem. The output of the first stage will afford a single potential pulse for every two pulses applied to the input, thus dividing in half the frequency of the original potential wavelength. Two or three or more stages in tandem divide the frequency of the original potential wave by four, eight or more, as desired.

In one of its applications, it is contemplated that the binary counter of the present invention will be operated under control of an oscillator to count the pulses in each so-called train or complete cycle of operation of a high speed radio telegraph transmitter operating in a stop-start system. Each such train may consist of any desired predetermined number of signal elements such as one hundred or more signal elements. Each such train will be divided into a fixed number of groups of signal elements, each group having a predetermined number of signal elements. One of these groups may be employed to control the starting and phasing of an individual oscillator in each of a group of mobile telegraph receivers. One group may be employed to select a predetermined receiver. Other groups may convey items of intelligence. The duration of a single potential wave cycle as generated by the oscillator is allotted for each signal element interval. The signaling may be at the rate of 6400 cycles per second, for instance.

From the foregoing it should be apparent that the binary counter is required to count the number of signal elements of an entire train and also to count the number of signal elements in portions of the train. In one contemplated embodiment of the present binary counter, the counter is required to indicate when each of fifteen different numbers has been counted, while the counter is counting approximately 107 cycles of the oscillator. In order to do this it is required that the binary counter array have fifteen different outputs. It is important that there be no interaction between these outputs.

A feature of the present invention is an arrangement which permits a binary counter array to control a large number of individual intermediate output counting branches while preventing interaction between the stages of the counter.

In the foregoing it was mentioned that a binary counter ordinarily has a number of counting stages. Each stage in succession receives two counts either from the input, or preceding stage, and, in response thereto, passes a single count to the succeeding stage or output. The present arrangement employs a pair of bistable transistors in each stage and a feature of the invention is the combination of such transistors and an inductor-capacitor link between their outputs arranged to pass one of each pair of counts received by each stage and to suppress the other.

These and other features of the invention may be understood from the following description when read with reference to the associated drawings in which the invention is presently incorporated. It is to be understood, however, that the invention is not limited to incorporation in the present embodiment but may be incorporated in others which may be suggested to those skilled in the art from a consideration of the following.

Figure 3:
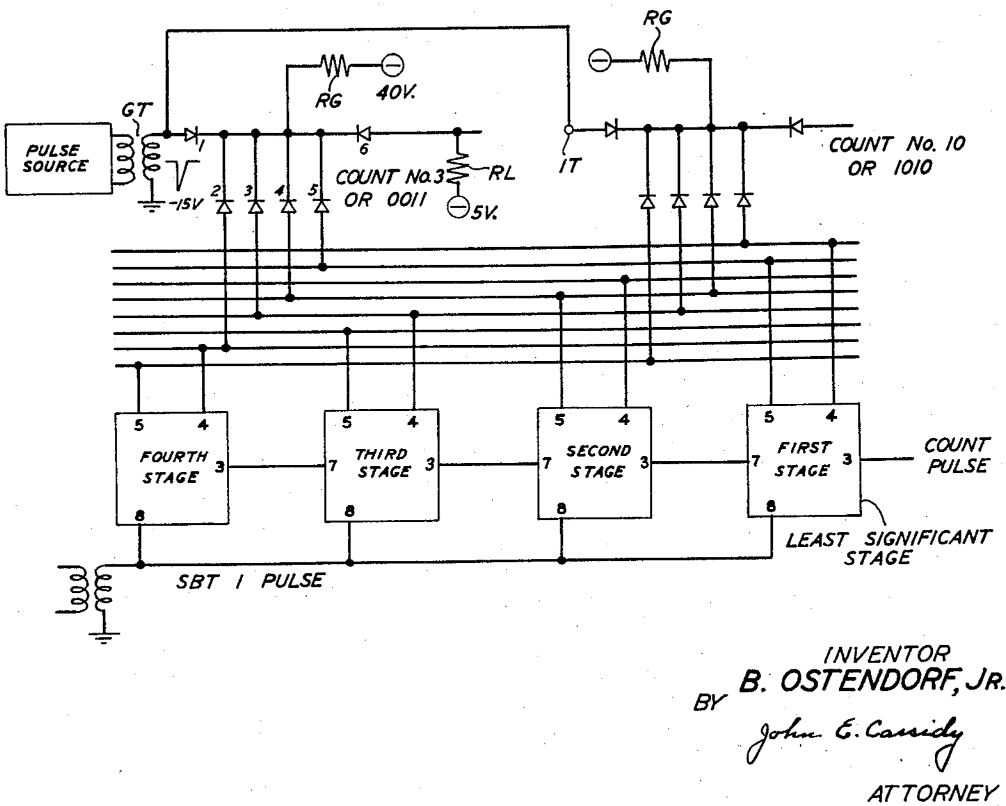
Figure 2:
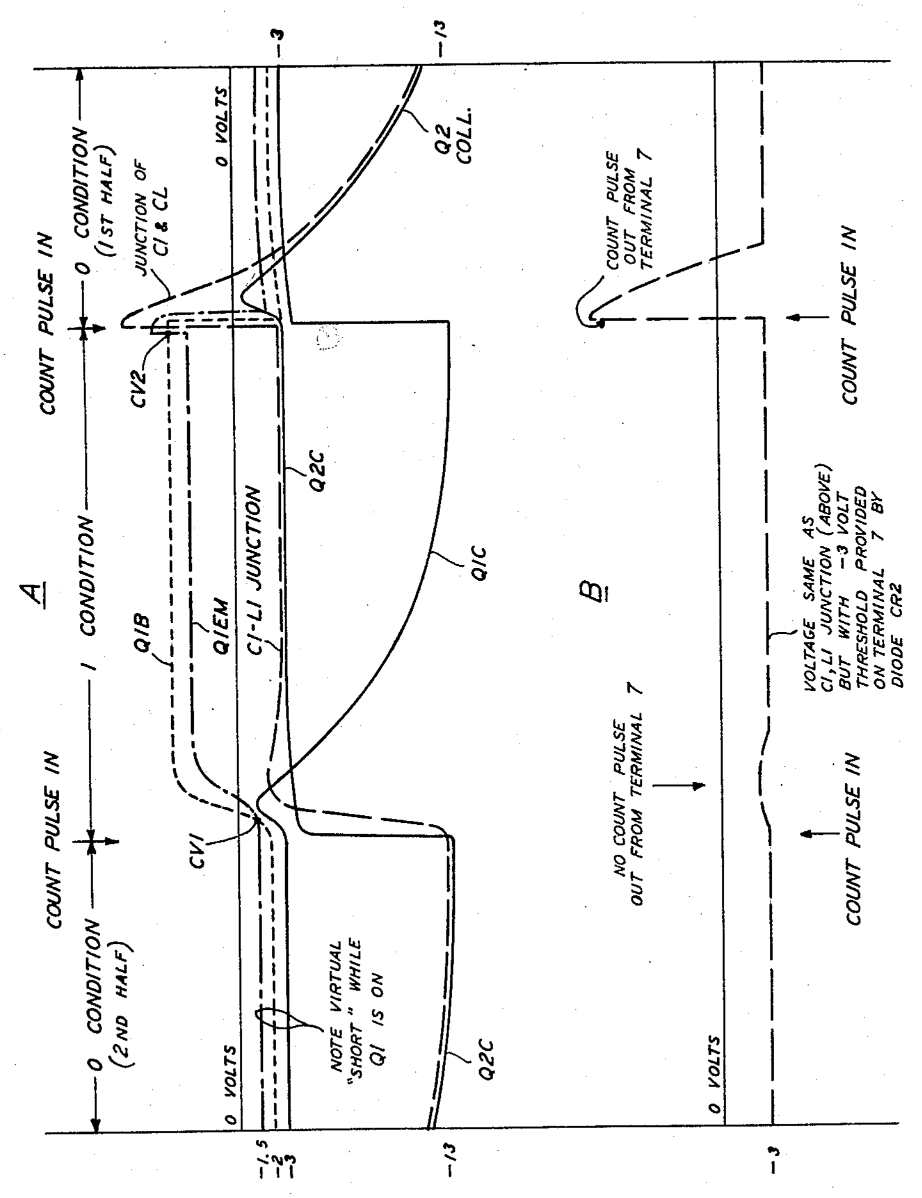

In the drawings:

Fig. 1 is a detailed circuit schematic of a single binary counter stage;

Fig. 2 is a diagram of a set of voltage wave forms used in explaining the invention; and Fig. 3 is a diagram showing, largely by means of captioned rectangles, a tandem array of binary counter stages having an input controlled by an oscillator and a plurality of outputs each controlling an individual gate circuit which is responsive to some predetermined count by the oscillator to in turn control the performance of some function.

Refer now to Fig. 1, the operation of which will first be described generally. Fig. 1 shows a single stage binary counter comprising two bistable transistors Q1 and Q2. It receives two pulses on its input terminal 3 and, in response thereto, delivers a single pulse, through its output terminal 7. If more than two pulses are to be counted, a number of stages of a binary counter as required may be connected in tandem to the first. It is to be understood that frequently a plurality of circuits such as Fig. 1 will be connected in tandem. That is to say the input terminal 3 of the first Fig. 1 will be connected to some pulsing source, such as to an oscillator, and, to permit counting to some number greater than 2, the number of stages required will be connected in cascade, with the output terminal 7 of each stage connected to the input terminal 3 of the next succeeding stage. When the array is required to count only the ultimate number possible with the number of stages provided, such as, for instance, to count $2^5$ or 32 for a five-stage counter and deliver only one pulse at the count of 32, the pulse may be obtained from the output terminal 7 of the fifth unit such as Fig. 1 in a tandem array. It is frequently desirable to obtain a pulse or pulses at some intermediate point or points in the counting. For this purpose two other individual intermediate count output leads are provided for each stage which extend from the collectors of the individual transistors Q1 and Q2 to terminals 5 and 4, respectively. One of these provides a pulse when the particular unit to which it is connected in the array is at its odd count and the other when it is at its even count. This will be explained in detail hereinafter.

A six-stage binary counter, for instance, will afford a count of $2^6$ or 64 and a seven-stage counter will afford a count of $2^7$ or 128. There are occasions when it is necessary to count more than 64 and less than 128. For instance, let it be assumed that it is necessary to count to 108 only. In a high speed telegraph system, for instance, in which only 108 signal elements were required in each signal train, it might be undesirable to waste the interval required to count from 108 to 128 by counting through the full cycle. The present circuit is arranged so that, after counting to any desired number in the counting capability of the last binary stage, it can be reset to a condition in which, in response to the next succeeding pulse, the counter is reset to the starting condition. This is the function of the transformer T1, also known as the Set 1 transformer, connected to terminal 8 and of the elements interconnecting the secondary of this transformer to the emitter of transistor Q1 and to the base of transistor Q2.

In the following, where the values of constants are cited, it is to be understood that they are to be considered as examples and not as limitations. The small circle in the drawings with the plus or minus sign therein, represent grounded positive or grounded negative battery, respectively.

Now the operation of the circuit of Fig. 1 will be described in detail. The principal elements in the circuit of Fig. 1 are two transistors, each of the point contact type which may advantageously each be a Western Electric Company, Incorporated, 1689 type transistor. Such transistors are well known in the art being described, for instance, in Patent No. 2,524,035, granted to J. Bardeen and W. H. Brattain, October 3, 1950.

The transistors are connected in a symmetrical bistable circuit. Due to the symmetrical or push-pull type of circuit, when one transistor is in its low current condition, the other transistor is in its high current condition. This makes it possible to have two outputs, one of which is the inverse of the other. When the potential of one of the outputs is at its more positive value, the potential of the other is at its more negative value. This makes the binary counter particularly suitable for the control of the matrix gate circuit to be described hereinafter.

In Fig. 1, resistors R2 and R3 are individual collector load resistors for transistor Q1 and transistor Q2, respectively. A circuit may be traced from a source of grounded negative potential, which may be −14 volts, for instance, through resistors R2 and R3 in parallel, to the collectors of transistors Q1 and Q2, respectively. Another circuit may be traced from a grounded source of positive potential, which may be +9 volts, for instance, through base load resistors R8 and R9, in parallel, to the base of transistors Q1 and Q2, respectively. In the high current condition the emitter of transistor Q1 may be held approximately at −1.5 volts by the circuit which extends from the emitter through diode CR1 and the secondary winding of transformer Set 1 to ground. In the low current condition the emitter of transistor Q1 is held cut off by a negative voltage developed across resistor R5 in a circuit which may be traced from grounded source of negative potential, which may for instance be −40 volts, through resistor R1, resistor R5 and resistor R8 to the source of positive potential, assumed as +9 volts, the magnitudes of resistors R1, R5 and R8 being properly proportioned to effect this. This emitter cut-off voltage is not appreciably affected by variations in collector leakage current, and is well known in the art as "emitter bias stabilization." In the low current condition the emitter of transistor Q1 is positive with respect to ground and diode CR1 presents a high resistance. This permits transistors Q1 to be easily triggered to the high current condition by a positive pulse coupled to the emitter from terminal 3.

In normal operation one bistable circuit is in the low current condition while the other is in the high current condition. When a positive counting pulse is applied to terminal 3, it is coupled through resistor R7 and in parallel through capacitor C2 and C3 to the emitter of transistor Q1 and of transistor Q2, respectively. This causes the low current transistor to be triggered to the high current condition. The resulting sudden rise in collector voltage is coupled through capacitor C1 and inductor L1 to the collector of the other transistor. This lowers the collector current of the transistor in the high current condition to such a low value that the transistor returns to the low current condition. The posiitve transient coupled through capacitor C1 and inductor L1 does not reach its maximum until a few microseconds after triggering. Transistors Q1 and Q2 are each of the high hole storage type and the delay in reaching the maximum is more efficient in returning the high current transistor to the low current condition than would be a sharply rising transient. At each count pulse the above action is repeated and both of the individual bistable circuits change state. The voltage output from the collectors swings between approximately −13 volts for the low current condition and −3 volts for the high current condition. When in the −3 volt condition a low impedance path is provided through the transistor and through the emitter diode to ground. This permits the gate currents from the matrix gate circuits which may be connected to terminals 4 and 5 to be absorbed without appreciable change in the −3 volt potential.

When transistor Q1 changes from the low current to high current condition, a positive pulse is produced at terminal 7. Just prior to such a transition, the potential at the junction between capacitor C1 and inductor L1 is about −3 volts. The sudden rise in collector voltage of transistor Q1, being coupled through capacitor C1, causes the junction of capacitor C1 and inductor L1 to swing to about +8 volts before following the collector of transistor Q2 in its transition to −13 volts. Diode CR2, therefore, conducts and a positive pulse is obtained across the external load connected to terminal 7, which can serve as the input counting pulse for a second binary counter stage through its terminal 3. At the next count pulse, when the collector of transistor Q2 suddenly rises from −13 volts to −3 volts, the junction of capacitor C1 and inductor L1 follows somewhat slowly, due to the effect of inductance L1. Diode CR2 remains biased in the reverse direction and no appreciable pulse appears at terminal 7. A binary counter must pass a counting pulse to the next higher order stage on the reception of the second pulse of each two-pulse cycle or when changing from the 1 to the 0 condition,, according to the usual convention. Therefore, this counter circuit is in the 1 condition when transistor Q1 is in the low current condition and transistor Q2 is in the high current condition. Thus, in the 1 condition, terminal 5 is at −13 volts and terminal 4 is at −3 volts. For the 0 condition, the voltages are interchanged.

The binary counter has two essentially independent bistable circuits with no direct-current coupling between them and it is possible for both of them to be in the same state. This is likely to occur at the time power is applied to the circuits. Means are therefore provided for starting the counter circuit in the 1 condition. This is done by returning the emitter of transistor Q1 to ground through the winding of the Set 1 transformer T1. A negative set 1 pulse from transformer T1 lowers the emitter of transistor Q1 negative with respect to the base for sufficient time to insure that transistor Q1 will rest in the low current condition at the end of the pulse. This same negative pulse is also coupled through the resistor R10 and capacitor C4 to the base of transistor Q2. This serves to trigger transistor Q2 to the high current condition if it is resting in the low current condition. The source of the Set 1 starting pulse must be low in impedance to permit a number of stages to be set to 1 from the same source and yet not cause interaction between the several emitter circuits during normal counting operation. Any appreciable common coupling may prevent some stages from changing from 1 to 0. The binary counter stages are started by a pulse, called a set all 1's pulse, which sets all stages to 1's rather than all to 0's, because it results in no interfering count pulses being passed between the stages. As explained when the second pulse of any cycle is applied to any stage, that is on a transition from the 1 condition to the 0 condition, a pulse is passed between stages.

The operation of the circuit of Fig. 1 may be better understood from a consideration of the voltage versus time curves shown in Fig. 2 which, in its upper section A, has a group of potential-time curves, showing these relationships for the emitter, collector and base of transistor Q1, the collector of transistor Q2 and the junction between capacitor C1 and inductor L1. This junction as has been explained connects to the binary counter stage output terminal 7.

The lower section B of Fig. 2 shows the actual output potential-time pattern for the binary counter stage at the output terminal 7. The scale units are arbitrary. Group A and group B also show a base or reference potential of 0 volts. The left-hand portion of Fig. 2 shows the potential relationships prevailing during the latter half of the interval while transistor Q1 is in its high current condition for the 0 condition of a counter stage, such as that of Fig. 1. This is followed by the first transisition relationships from the 0 condition to the 1 condition of the counter stage. Next the relationships prevailing for the 1 condition of the counter stage, while transistor Q1 is in the low current condition, is shown, in the middle of Fig. 2, followed by those of the second transition from the 1 condition to the 0 condition of the counter stage and then, at the right, the relationships after the transition of the counter stage from 1 to the 0 condition during the first portion of the interval while transistor Q1 is in its high current condition. It has been explained that the condition of transistor Q2 is opposite from that of transistor Q1. When transistor Q1 triggers from its high to its low current carrying condition and vice versa, transistor Q2 does the opposite. The two transistor circuits in Fig. 1 are symmetrical and the potential relationships for the emitter and base of transistor Q2 are the same as for the emitter and base of transistor Q1 except that they are in opposite phase.

The magnitude of the potentials of the various curves shown in Fig. 2 are based on the potential conditions assumed in the foregoing description of the circuit of Fig. 1 and are approximate, but the polarity relationships between them are accurate.

It will be observed that when a transistor, such as transistor Q1 in Fig. 1, is in its high current condition, there is a virtual short circuit between its emitter, base and collector. The potential of the emitter of Q1 shown by curve Q1EM is at −1.5 volts, this being the voltage drop across diode CR1. The potential of the base Q1B is at −2 volts and of the collector Q1C is −3 volts. When transistor Q1 is triggered, on the reception of the first count pulse, to its low current condition, the potential of its emitter Q1EM rises to about +3 volts and that of its base Q1B to about +4 volts. There is an actual changeover as shown at changeover point CV1, in the polarity of their relative potentials on transition from one stage to the other. During the high current condition of transistor Q1, as noted, the potential of its collector Q1C is at −3 volts. On triggering to the low current condition, this potential changes, relatively slowly as indicated in curve Q1C, to approximately −13 volts. On again triggering to the high current condition the potential of the elements of transistor Q1 change to their original magnitudes and polarity relationships. Attention is called to the momentary rise in potential of the emitter of transistor Q1, as shown on curve Q1EM, at the time when it receives the second count pulse. This count pulse applied to the emitter of transistor Q1 is a positive pulse which drives the emitter positive with respect to its base as shown at crossover point CV2 of curve Q1EM and Q1B.

Section A of Fig. 2 shows two other potential-time curves, curve Q2C for the collector of transistor Q2 and curve C1–L1 junction for the potential of the junction of capacitor C1 and inductor L1. The potential of the collector of transistor Q2 as shown on curve Q2C, varies as does the collector of transistor Q1C, but is opposite in phase therefrom. Collector Q2C is at −13 volts when the collector of transistor Q1 is at −3 volts and vice versa. The potential of the junction of capacitor C1 and inductor L1 varies as shown on curve C1–L1 junction in section A of Fig. 2. It is apparent from this curve, and a comparison of it with the curve Q2C of the potential of the collector of transistor Q2, that when transistor Q2 is in its steady low current condition, the potential of collector Q2C and that of the junction point of capacitor C1 and inductor L1 will be substantially the same. On the arrival of the first count pulse and the transition to the high current carrying condition of transistor Q2, its collector voltage changes rapidly, while that of the junction point of capacitor C1 and inductor L1 changes more slowly, due to the effect of the inductance of inductor L1. However, notwithstanding, both are at their more positive value, both remain negative. Thereafter the potential of both remain substantially the same at their more positive value of about −3 volts until the arrival of the second count pulse which is applied through the collector of transistor Q1 and capacitor C1 on the junction point of capacitor C1 and inductor L1. This is a positive going pulse caused by the transition from the low to the high current carrying condition of transistor Q1 and the consequent positive swing of its collector. The impedance offered by capacitor C1 to this transient is small and the junction of capacitor C1 and inductor L1 actually goes positive to about +8 volts. The effect of the inductance of inductor L1 delays and limits its application to the collector of transistor Q2, which rises slightly, then falls slowly to −13 volts for its low current carrying condition. After attaining its sudden positive peak, the potential of the junction of capacitor C1 and inductor L1 subsides with that of the collector of transistor Q2C to approximately −13 volts. It is pointed out that the purpose of capacitor C1 is to quickly pass the positive transient pulse from the collector of transistor Q1 on its transition from its low to its high current condition. When steady state is attained, capacitor C1 isolates the collector of transmitter Q1 from the output terminal 7. The purpose of inductor L1 is to delay and minimize the effect of the potential change of the collector of transistor Q2 on the junction of capacitor C1 and inductor L1, when transistor Q2 changes from its high current to its low current condition. The net result of the foregoing is as shown in section B of Fig. 2, to effectively pass but one pulse from the junction of capacitor C1 and inductor L1 through diode CR2 to output terminal 7. This pulse will be the effect of the positive pulse produced on the collector of transistor Q1 on the transition of transistor Q1 from its low to its high current carrying condition. The positive pulse produced at the junction of capacitor C1 and inductor L1 will pass freely through diode CR2 to the output. The other pulse on the opposite transition will be small and ineffective.

Refer now to Fig. 3 which shows the manner of controlling a plurality of gate circuits, known as matrix gates, by means of a binary counter, which latter has a plurality of stages, seven for instance, four only of which are shown, and assuming seven stages, is capable of counting a sufficient number of cycles or signal elements to properly control a signal train having not more than 128 signal elements. Each gate has a plurality of semiconductor-type diodes with a terminal of common polarity, the negative terminal in this case, of each diode connected to a common point, to which is also connected a single supply resistor RG, which may be for instance 7500 ohms, the remote terminal of which is connected to a source of negative potential, such as —40 volts. The positive terminal of one of the diodes, diode 1, called the input diode, connects through the secondary of an input transformer GT to ground. The primary of the input transformer GT connects to a pulsing source, which may be, for instance, an oscillator. The oscillator supplies a pulse for each signal element of the train. The secondary of the input transformer also is connected in parallel to the input diode, corresponding to diode 1, of each other gate, in parallel, so that each pulse in a train is applied to the input diode of all gates. The objective of the arrangement is to permit a single pulse to pass through the individual output diode of a particular gate when the binary counter has attained the count assigned to the gate. Each individual gate will be arranged to pass a pulse at some predetermined individual count. There will be as many gates required as there are counts to be passed. This will depend upon the number of functions required to be performed while a single signal train is being transmitted.

Semiconductor type diodes are known in the art and are described, for instance, in Patent No. 2,402,662, granted to R. S. Ohl, June 25, 1946.

Diode gate circuits are well known in the art being described, for instance, in Patent No. 2,673,936, granted to J. R. Harris, March 30, 1954.

The way the present combination of diode gate, or matrix gate, and the present binary counter cooperate is as follows. In addition to the left-hand or input diode and the right-hand or output diode in each gate, there are a plurality of control diodes responsive to the binary counter, one diode per stage per gate. These control diodes are those such as diodes 2 to 5 of left-hand gate in the upper portion of Fig. 3. The current supplied from the negative potential source, through the resistor RG to the common junction of all of the diodes is intended to be passed through the output diode to the load at the particular predetermined count for each individual gate. The control diodes are intended to apply such potentials to the common junction that the path through the output diode to the load is always blocked except during the reception of the predetermined counted pulse assigned for the particular gate. The blocking is performed by the shunting effect of the control diodes connected to the binary counter stages. Some one or more of the diodes connected to the binary counters effectively shunt the path through the output diode except during the particular count which the gate is arranged to pass.

It was explained in the foregoing that, in addition to the output terminal of each binary counter stage, such as that shown in Fig. 1 indicated as extending to terminal 3 of the following stage, there are two other output terminals, namely terminal 4 and terminal 5. The potential of each of these two terminals is alternated, in response to alternate counts, between —3 volts and —13 volts, for instance, simultaneously with that of the respective collector to which each terminal is connected. There is an individual gate control diode for each gate from each stage and it will be connected to one or the other of terminals 4 or 5 in each stage.

The pulse source supplies a pulse having a negative peak of —15 volts, for instance, during every count for each signal interval. When this pulse is supplied, if any one or more of the binary counter stages is applying its more positive potential of —3 volts, for instance, to the lower terminal of its or their respective diode or diodes, the pulse from the pulse source will be passed through such diode or diodes and the path through the output diode to the load which is terminated in a potential source more negative than —3 volts, —5 volt source, for instance, will be shunted. If, however, all of the counter stages are applying their more negative potential of —13 volts, for instance, to their respective diodes, each control diode will be in its high resistance condition during a major portion of the pulse, that is except during the very short interval during which the pulse is more negative than —13 volts, and a pulse will be transmitted to the load.

It is particularly pointed out that current from the negative gate pulses comes from the negative source connected through resistors RG and is over 5 milliamperes for each gate. A negative voltage pulse from the gate input transformer GT is applied in parallel to all gates and cuts off the 5-milliampere direct current through the input diodes, such as diode 1. This same 5-milliampere current therefore must find a path through one of the other diodes and will choose the diode which connects to the most positive, or least negative, source. If some of the counter stage circuits, connected to the gate through terminals 4 or 5, are at —3 volts simultaneously, they will be the least negative sources connected to the gate and they will absorb the 5-milliampere pulse current.

If all counter conductors connected to a gate are at —13 volts, the path through the output diode to the load resistor RL will be the least negative. Therefore, the 5-milliampere pulse will be applied to the load and will appear as a negative output pulse voltage.

On occasions, depending on the permutations of the potential combinations, it will be necessary for a single counter stage circuit through a single transistor to absorb the pulse currents from a number of gates and, less frequently, from all of the gates, simultaneously. In the present embodiment it is assumed that there are 15 gates. Such a number is required for a particular high speed radio telegraph circuit on which the present circuit is to be applied. In other systems, more than fifteen gates may be controlled by the present binary counter. This puts a severe requirement on the transistor circuits. However, it is pointed out that transistors Q1 and Q2 are point contact transistors and that the pulse currents increase only the high current condition collector current. The bistable margins are not disturbed. A decrease of collector current might upset operation, but the present circuit is arranged as described so that the gate pulses cause an increase of current in the high current condition of the transistor. During the high current condition of either transistor Q1 or Q2 of any stage, the impedance of the path shown in Fig. 1, extending from the collector through the transistor to the emitter is substantially short-circuited and the impedance of the path to ground through either diode is low, as the diode at such time is in its low resistance condition. Therefore, the change in voltage of the collector is relatively small.

It is pointed out that heretofore when transistors have been employed in two-transistor binary counters, junction transistors have been employed. Such transistors could not tolerate pulse currents tending to increase collector currents, as the collector voltage would increase substantially negatively and the circuit would be falsely triggered by the gate pulse. The arrangement to prevent this is one of the important features of the invention. The difficulty pointed out in the foregoing is characteristic of known single transistor counters and of two-transistor counters employing a common emitter resistor. Such circuits are widely employed as so-called flip-flop circuits. These other types of circuits would not be operable with large numbers of high speed gates of the present arrangement.

A further explanation of the counting will now be given preliminary to a detailed explanation of how the two gates in Fig. 3 are controlled by the binary counter.

It was explained in the foregoing that a pulse, a set all 1's pulse, might be applied simultaneously, in parallel, to the terminal No. 8 of each stage of the counter, to set each stage in the 1 condition simultaneously. The application of this set all 1's pulse will, in effect, cause the counter to skip intervening counting conditions, between its condition for the count attained immediately before its application, to a condition wherein, in response to the next succeeding count pulse applied to terminal 3 of the first stage, all stages, however many, will be actuated to pass a count on to the next succeeding stage and from the output, if any, of the last stage. This condition wherein all stages of the counter are primed, as it were, to pass a pulse on to the next succeeding stage in response to a single pulse applied to the input of the least significant stage is conventionally termed the all 1's condition of the counter. The pulse next following the all 1's conditioning pulse will erase the 1's condition in each stage and will set each stage of the counter in the alternative condition, which is conventionally termed the all 0's condition. The pulse which effects this transistion from the all 1's to the all 0's condition of the counter may logically and conveniently be termed the 0 count pulse, as it places the counter in the condition from which counting, starting at count 1, may start.

Starting from the all 0's condition, it will require two pulses to actuate the first stage through one cycle and to pass a pulse on to the second stage. The first pulse into stage 1 following the all 0's condition of the counter, which sets the first stage only in what is called its 1 condition, is termed the count 1 pulse. On this basis the number of the first count pulse would correspond with the number 1 condition of the first stage, which, according to convention, is the condition assumed by the first stage, or any stage, in response to the first pulse of a cycle applied thereto. The 128-unit counting range of a seven-stage counter on this basis would be numbered from 0 to 127 and the all 0's condition pulse could be thought of as a preliminary or conditioning count preceding the numbering, starting at 1.

The table below shows the condition of each of the four stages of a four-stage binary counter based on the foregoing description.

| Count | Condition of stages following reception of counting pulse | | | |
|---|---|---|---|---|
| | Fourth stage | Third stage | Second stage | First stage |
| Count 15, last count (or set all 1's) | 1 | 1 | 1 | 1 |
| Count 0, preliminary count (or set all 0's) | 0 | 0 | 0 | 0 |
| Count 1 | 0 | 0 | 0 | 1 |
| Count 2 | 0 | 0 | 1 | 0 |
| Count 3 | 0 | 0 | 1 | 1 |
| Count 4 | 0 | 1 | 0 | 0 |
| Count 5 | 0 | 1 | 0 | 1 |
| Count 6 | 0 | 1 | 1 | 0 |
| Count 7 | 0 | 1 | 1 | 1 |
| Count 8 | 1 | 0 | 0 | 0 |
| Count 9 | 1 | 0 | 0 | 1 |
| Count 10 | 1 | 0 | 1 | 0 |
| Count 11 | 1 | 0 | 1 | 1 |
| Count 12 | 1 | 1 | 0 | 0 |
| Count 13 | 1 | 1 | 0 | 1 |
| Count 14 | 1 | 1 | 1 | 0 |
| Count 15, last count (or set all 1's) | 1 | 1 | 1 | 1 |

In order to control a diode gate by a binary counter, it is necessary that there be a control lead from each stage, through a diode individual to the stage, to the common junction of the gate. Only thereby is it possible for each stage to cooperate in producing the potential combinations necessary to prevent the passage of a pulse through the gate at any count other than the intended count. In order to prevent passage at any count other than the intended count for which the gate is arranged, it is necessary that at least one binary counter stage shunt the gate output path. If a connection to any stage of the counter were omitted, at counts on which, according to the permutations of the voltage combinations, the omitted stage should be the only stage applying a shunt to the gate output, the shunt would not be available and a pulse, at a false count, would pass to the load.

In order to permit the passage of a pulse, through the output of some one of the gates, at some one predetermined count only, each stage of the counter must be connected through an individual diode to the gate and the connection from the diode must be made to the particular one of terminals 4 or 5 of its respective stage which is negative at the particular count. Then, as the connections to all controls are negative, and each possible diode shunt is in its high resistance condition, the pulse will pass through the output of a gate, as it cannot be shunted through any of the stages of the counter.

For the 1 condition of any stage as seen in Fig. 2, collector Q1C is the more negative. As seen in Fig. 1, terminal 5 connects directly to the collector Q1. Therefore, terminal 5 of any stage which is in the 1 condition at any count when a pulse must be passed through the gate output, must be connected to the respective control diode for the stage. For the 0 condition of each stage, collector Q2C will be at the more negative potential, and terminal 4, connected directly to it, will be the more negative of the two terminals. Therefore, terminal 4 of any stage which is in the 0 condition at any count when a pulse must be passed through a gate must be connected to the respective diode in the gate for that stage. To reiterate only one terminal for each stage, either terminal 4 or 5, the one of them which is more negative, at the condition indicated for the stage in the foregoing table, at the count at which a pulse is to be passed, will be connected to its respective diode.

Refer now to Fig. 3, which shows, as explained in the foregoing, the first four stages of a binary counter, each stage represented by a captioned rectangle, which in detail is an individual circuit as in Fig. 1. Connected to the stages are two gates, shown in the upper portion of Fig. 3. The left-hand gate is arranged to pass a pulse through output diode 6 of the gate at count 3. The right-hand gate is arranged to pass a pulse through an individual diode therein, corresponding to diode 6, at count 10. The permutative conditions of the counting stages at count 3 and at count 10 will be as indicated in the table in the foregoing.

As shown in the foregoing table, the combination for count 3 is 0011. The order of the digits is the same as the physical arrangement of the rectangles representing the stages in Fig. 3, with the least significant of each on the right.

Following the description in the foregoing, the terminals for the four corresponding stages of the counter in Fig. 3, connected to the respective diode for each stage for the left-hand gate in Fig. 3, which passes the pulse at count 3, will be 4455 in order from left to right.

The right-hand gate, which passes a pulse at count 10, has a combination for count 10 appearing in the table as 1010. Therefore, the terminals 5454 will be connected to the respective diode for each stage, in order from left to right. It is considered that the manner in which other gates may be arranged to pass other pulses at other counts will be apparent from the foregoing.

What is claimed is:

1. In an electrical counting system, a binary counter, said counter having an input circuit and an output circuit, said counter having a counting stage comprising a first and a second transistor, means responsive to a first and a second pulse impressed on said input circuit in sequence for actuating each of said transistors alternately to a first and a second condition, selecting means, in said output circuit, responsive to one of said pulses, for impressing a pulse on a load connected to said output circuit, said selecting means, responsive to the other of said pulses, for suppressing a pulse on said load, said selecting means comprising a collector for each said transistor interconnected through a common capacitor and an inductor, and a diode connected to the junction of said capacitor and inductor.

2. A system in accordance with claim 1, said transistors each having an emitter and a base, another input circuit having a first branch connected to an emitter of one of said transistors and a second branch connected to the base of the other of said transistors, for setting said transistors initially in a starting condition.

3. In an electrical counting system, a binary counter stage circuit having a first and a second transistor, an emitter, a base and a collector on each of said transistors, potential sources connected to each of said emitters, bases and collectors, an output circuit interconnecting said collectors, said output circuit having a capacitor and an inductor in series and a single common output branch connected to the junction of said capacitor and inductor means for applying a succession of pulses to said counter stage circuit, means responsive to each of said pulses for transmitting a pulse between said collectors, means including said capacitor and inductor for transmitting one of each pair of consecutive pulses to said output branch and means inncluding a diode in said branch for suppressing the other pulse of each pair.

4. In an electrical system, a circuit having means therein for actuating said circuit alternately to a first and a second condition in response to a first and a second signal pulse applied thereto in sequence, said circuit having a first and a second transistor, each of said transistors having an emitter, a collector and a base, a connection from a source of potential through individual ones of a first pair of resistors in parallel to said bases individually, a connection from another source of potential through individual ones of a second pair of resistors in parallel to said collectors individually, a connection from a source of potential through individual ones of a third pair of resistors to said emitters individually and extending through individual ones of a fourth pair of resistors in parallel to said bases individually, an input circuit from a common source of signals through individual ones of a pair of capacitors to said emitters individually, an output circuit having a capacitor and an inductor in series interconnecting said collectors, a common branch extending from the junction of said capacitor and inductor through a diode to a load and an individual circuit extending from ground through a diode to each emitter.

5. In an electrical system, in combination, a binary counter having a counting stage comprising a transistor, an emitter and a collector for said transistor, a plurality of low impedance matrix gate circuits connected in parallel to said transistor, each of said circuits consisting of a single direct-current series path extending through an individual diode directly to said collector and through said transistor to said emitter, means in said circuits for passing a current pulse from each of said gates simultaneously through said collector and emitter, responsive to a potential condition prevailing while the path in said transistor between said collector and said emitter is in a low impedance condition and a low impedance termination for said path effectively connected directly to said emitter while said potential condition prevails, said termination consisting of a semiconductor diode and a low impedance transformer winding connected in series between said emitter and ground.

6. In an electrical system, in combination, a binary counter having a counting stage comprising a transistor, a point contact emitter electrode and a point contact collector electrode for said transistor, a plurality of low impedance matrix gate circuits connected in parallel through said transistor, each of said circuits consisting of a single direct-current series path extending through an individual diode directly to said collector electrode and through said transistor to said emitter electrode, means connected to each of said gate circuits for passing a current pulse from each of said gate circuits simultaneously through said paths, responsive to a potential condition prevailing while the path through said transistor between said two electrodes is in its low impedance condition, and a low impedance termination effectively connected directly to said emitter electrode while said potential condition prevails, said termination consisting of a semiconductor diode connected between said emitter and ground.

7. In an electrical system, a binary counter, a counting stage in said counter, a first and a second transistor in said stage, means for actuating said transistors alternately to their first and their second conditions in response to a first and a second pulse applied to each of said transistors, a point contact output electrode for each of said transistors, a connection from said electrode of said first transistor extending through a capacitor and an inductor to said electrode on said second transistor, a first output connection extending from the junction of said capacitor and inductor through a diode to a succeeding stage, a second output connection extending directly from said electrode on said first transistor and a third output connection extending directly from said electrode on said second transistor.

8. A system in accordance with claim 7 having, in combination, a connection from said second output, through a control diode individual to said stage in a matrix gate.

9. In an electrical system, in combination, a matrix gate, a first gate control diode connected to said gate, a binary counter, a counting stage in said counter, a transistor in said stage, a first and a second point contact electrode for said transistor, a first circuit connecting said diode and said first electrode, a second circuit connecting said second electrode directly through a second diode directly to ground, means responsive to the application of a counting pulse to said stage for lowering the impedance between said electrodes and of said path to ground, and means for simultaneously passing a pulse from said gate through said first diode, said first circuit, said first electrode, said transistor, said second electrode and said second diode to ground.

References Cited in the file of this patent

UNITED STATES PATENTS

| | | |
|---|---|---|
| 2,535,303 | Lewis | Dec. 26, 1950 |
| 2,570,716 | Rochester | Oct. 9, 1951 |
| 2,594,449 | Kircher | Apr. 29, 1952 |
| 2,673,936 | Harris | Mar. 30, 1954 |
| 2,706,811 | Steele | Apr. 19, 1955 |